United States Patent [19]
Dupont

[11] Patent Number: 4,955,287
[45] Date of Patent: * Sep. 11, 1990

[54] SELF-VENTILATED GREENHOUSE

[76] Inventor: Daniel L. Dupont, 22-B Talbot Rd., Plaquemine, La. 70764

[*] Notice: The portion of the term of this patent subsequent to Mar. 28, 2006 has been disclaimed.

[21] Appl. No.: 327,320

[22] Filed: Mar. 22, 1989

Related U.S. Application Data

[63] Continuation-in-part of Ser. No. 184,360, Apr. 21, 1988, Pat. No. 4,815,365.

[51] Int. Cl.⁵ .............................................. F24F 7/02
[52] U.S. Cl. ......................................... 98/42.2; 47/17; 52/2 G; 52/2 H
[58] Field of Search .............. 47/17, 19; 52/2 R, 2 G, 52/2 H, 18, 64, 68, 222; 98/42.14, 42.16, 42.2, 42.21

[56] References Cited

U.S. PATENT DOCUMENTS

| | | | |
|---|---|---|---|
| 104,142 | 6/1870 | Hall | 52/18 |
| 1,070,434 | 8/1913 | Farquhar | 52/18 |
| 1,923,217 | 8/1933 | Lafferty | 47/17 |
| 3,028,872 | 4/1962 | Cresswell | 47/17 X |
| 4,012,867 | 3/1977 | Lainchbury et al. | 47/17 X |
| 4,312,157 | 1/1982 | Hertel et al. | 52/13 |
| 4,348,833 | 9/1982 | Hagoya | 47/17 |
| 4,399,738 | 8/1983 | Sharkey | 98/32 |
| 4,510,921 | 4/1985 | Yano et al. | 126/429 |
| 4,601,136 | 7/1986 | Watanabe | 52/63 |
| 4,672,889 | 6/1987 | Lynch | 98/42.4 |

FOREIGN PATENT DOCUMENTS

| | | | |
|---|---|---|---|
| 662194 | 7/1938 | Fed. Rep. of Germany | 47/17 |
| 925981 | 4/1955 | Fed. Rep. of Germany | 47/17 |
| 861621 | 5/1963 | Fed. Rep. of Germany | 47/17 |
| 1101240 | 1/1968 | United Kingdom | 47/17 |

*Primary Examiner*—Harold Joyce
*Attorney, Agent, or Firm*—Reginald F. Roberts, Jr.

[57] ABSTRACT

A frame for a self-ventilated greenhouse, a self-ventilated greenhouse, and a method for controlling the air pressure between the layers of a double-layer roof for a greenhouse. The frame for the greenhouse comprises first and second parallel rows of upright sideposts; first and second sets of elongated, arcuate frame members; a plurality of cross-members hingedly connecting the sets of frame members; and means for separating and reuniting the sets of frame members. A roof for the greenhouse is provided by disposing first and second translucent sheets above the first and second sets of arcuate frame members, thereby conveting the frame into a greenhouse. The method comprises sealing the ends of a pair of sheets along their edges to form an inflatable pouch, disposing the sealed sheets above a frame to form a roof for a greenhouse, inflating the pouch, and controlling the pressure within the pouch with a back-pressure control valve.

9 Claims, 3 Drawing Sheets

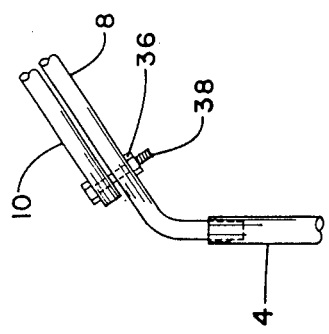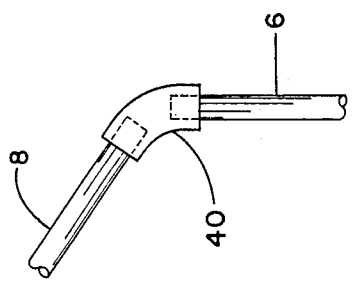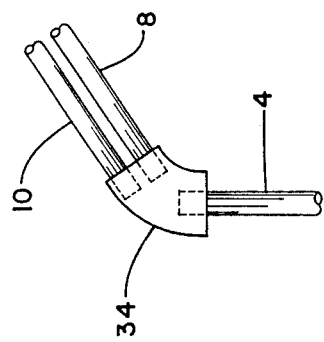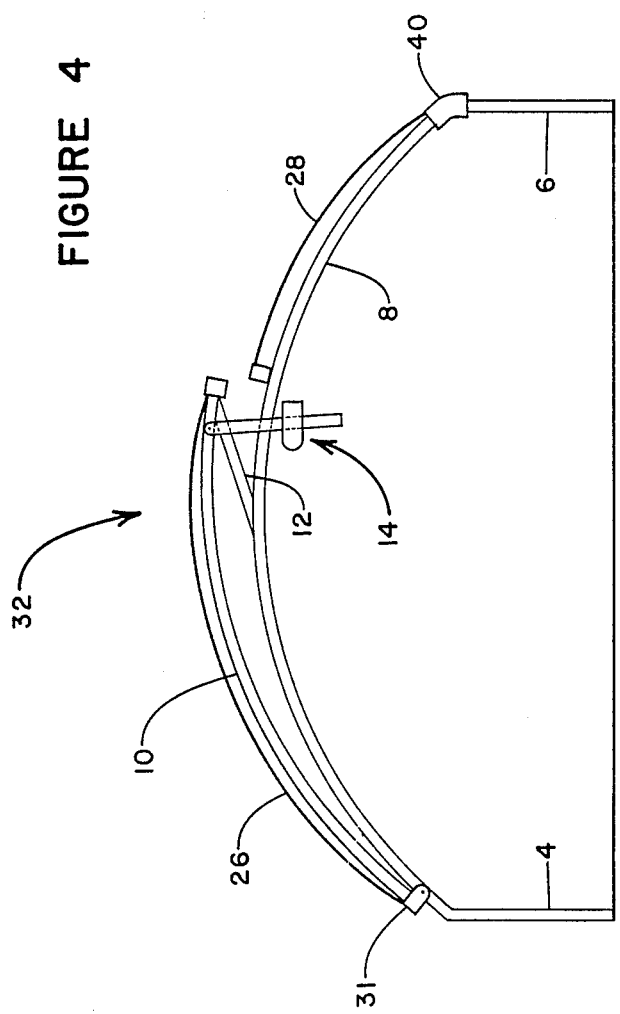

SELF-VENTILATED GREENHOUSE

CROSS-REFERENCE TO RELATED APPLICATION

This application is a continuation-in-part of Application Ser. No. 184,360, filed Apr. 21, 1988, to issue as U.S. Pat. No. 4,815,365 on Mar. 28, 1989.

BACKGROUND OF THE INVENTION

The present invention relates to greenhouses. More particularly, the invention relates to the ventilation of greenhouses.

An efficient ventilation system is a very important feature of any greenhouse. Prior-art means and methods for ventilating greenhousing are many and varied, but the ventilation means either comprise structures separate from the main structure of the greenhouse, or they require specialized and expensive equipment.

In a related application, the present inventor disclosed several embodiments of his invention which represent marked improvement in the technology of greenhouse ventilation. This application and the patent which will issue thereon are hereby incorporated by reference.

SUMMARY OF THE INVENTION

In general, the present invention in one aspect provides a frame for a self-ventilated greenhouse. The first embodiment thereof comprises first and second parallel rows of rigid, elongated vertical members; first and second sets of elongated frame members; a plurality of cross-members hingedly connecting the sets of elongated frame members; and means for separating and reuniting the sets of frame members.

A first end of each elongated frame member of the first set is secured to the upper end of one of the members comprising the first row of vertical members. The second end of each frame member of the first set is secured to the upper end of one of the members comprising the second row of vertical members.

The second set of elongated frame members is disposed above the first set of frame member, is shorter than the first set of frame members, and partially overlaps the first set of frame members. A first end of each frame member of the second set is secured to the upper end of one of the members comprising the first row of vertical members.

The cross-member hingedly connect the second end of each frame member of the second set to a frame member of the first set, at a point on the frame member of the second set lying between the end of the frame member of the second set, to guide the frame members of the second set as they are separated from and reunited with the frame members of the first set, to provide intermittent ventilation for the greenhouse.

In a second aspect, the invention provides of self-ventilated greenhouse. A first embodiment thereof comprises a frame as above described for a first embodiment of a frame for a greenhouse made in accordance with the principles of the present invention. The greenhouse further comprises a first translucent sheet disposed above and supported by the second set of elongated frame members, and a second translucent sheet disposed above and supported by that portion of each of the frame members of the first set extending from the upper end of the second vertical member to the junction of the frame member of the first set with the cross-member.

The first and second translucent sheets thereby form a self-ventilated roof for the greenhouse.

In a third aspect, the invention provides a second embodiment of a frame for a self-ventilated greenhouse. The frame comprises the same elements as does the first embodiment of a frame for a greenhouse. However, in the second embodiment the frame differs in arrangement from that of the first embodiment, by having the first end of an elongated frame member of the second set secured to the first end of a frame member of the first set instead of to the upper end of a vertical member.

In a fourth aspect, the invention provides a second embodiment of a self-ventilated greenhouse. The second embodiment of the frame described above is converted into a self-ventilated greenhouse by disposing a first translucent sheet above the second set of elongated frame members, and a second translucent sheet above that portion of each of the frame members of the first set extending from the upper end of the second-row vertical to the junction of the frame member of the first set with the cross-member, thereby providing a self-ventilated roof for the greenhouse.

In a fifth aspect, the invention provides a third embodiment of a frame for a self-ventilated greenhouse. The frame comprises first and second parallel rows of rigid, elongated vertical members; first and second sets of a plurality of first and second partially overlapping upper and lower elongated frame members; a plurality of cross-members which hingedly connect the first and second sets of frame members near the second ends of the frame members, to guide the frame members as the frame members are separated and reunited to provide intermittent ventilation for the greenhouse; and means for separating and reuniting the frame members.

A first end of each first frame member is connected by a hinge to the upper end of a vertical member in the first row of vertical members. A first end of each second frame member is connected to a vertical member in the second row of vertical members. The second end of each first frame member is disposed above and overlaps the second end of each second frame member. A plurality of cross-members hingedly connect the first and second sets of frame members near the second ends of frame members, to guide the frame members as the frame members are separated and reunited to provide intermittent ventilation for the greenhouse.

In a sixth aspect, the invention provides a third embodiment of a self-ventilated greenhouse. The third embodiment of the frame is provided with a roof by disposing a first translucent sheet above the first set of frame members, and a second translucent sheet above the second set of frame members.

In a seventh aspect, the invention provides a method for controlling the inflation pressure of a double-layer roof for a greenhouse. The method comprises (a) sealing first and second translucent sheets, at least one of which is flexible along their edges to form an inflatable pouch therebetween; (b) utilizing the sealed first and second sheets as a roof for the greenhouse, by disposing the sheets above a frame for the greenhouse; (c) inflating the pouch; and (d) controlling the pressure within the pouch with a back-pressure control valve.

BRIEF DESCRIPTION OF THE DRAWINGS

FIG. 3 is a schematic representation of a third embodiment of a greenhouse made in accordance with the principles of the present invention.

FIG. 4 is a schematic representation of an extension bracket used to secure first and second elongated frame members to an elongated vertical member.

FIG. 5 is a schematic representation of a device used to secure a second elongated frame member to a first elongated frame member.

FIG. 6 is a schematic representation of a device connecting an elongated frame member to an elongated vertical member.

DETAILED DESCRIPTION OF THE INVENTION

Figure 1:
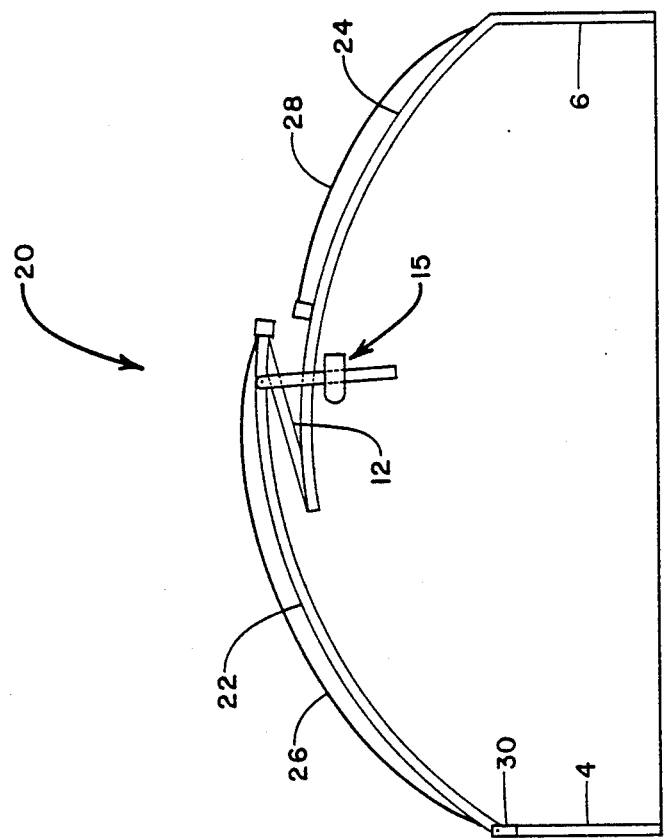
FIG. 1 is a schematic representation of a first embodiment of a greenhouse made in accordance with the principles of the present invention.

More specifically, reference is made to FIG. 1, in which is shown a first embodiment of a self-ventilated greenhouse made in accordance with the principles of the present invention, generally designated by the numeral 2.

The greenhouse 2 comprises first and second sideposts 4 and 6 which are anchored in the ground or in a foundation. A first arcuate frame member 8 spans the posts 4, 6, and is connected thereto. A second arcuate frame member 10 is disposed above the first arcuate member 8 in such a way as to overhang and overlap part of the arcuate member 8. One end of the second frame member 10 is secured to the upper end of the first sidepost 4. The other end of the second frame member 10 is connected to the first arcuate member 8 by a cross-brace member 12. The other end of the frame member 10 is connected through and by a rack-and-pinion 14 to the cross-brace 12. The rack-and-pinion 14 is used to open and close the roof of the greenhouse 2, thereby providing intermittent ventilation of the greenhouse.

A roof for the greenhouse 2 is formed by disposing a first translucent sheet 16 over the second set of elongated frame members 10, and a second translucent sheet 18 above a portion of each of the frame members 8 of the first set of frame members. The portion of the frame members 8 which support the second sheet 18 extends from the upper end of the sideposts 6 to the junction of the cross-brace 12 with the first frame member 8. This junction is preferably about midway between the first and second rows of sideposts 4 and 6.

Figure 2:
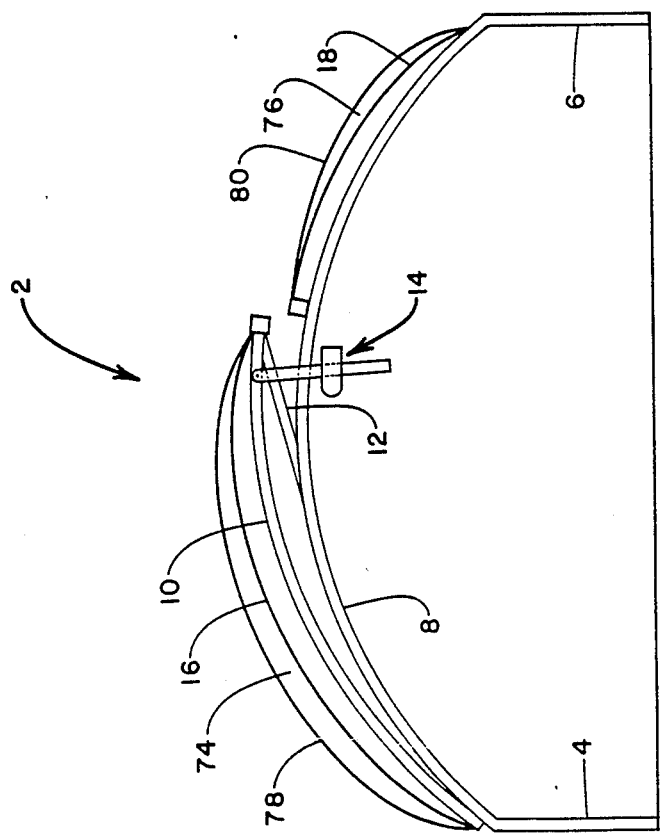
FIG. 2 is a schematic representation of a second embodiment of a greenhouse made in accordance with the principles of the present invention.

Reference is now made to FIG. 2, wherein is shown a second embodiment of a self-ventilated greenhouse made in accordance with the principles of the present invention, designated generally by the numeral 20.

The greenhouse 20 comprises a frame which includes first and second arcuate frame members 22 and 24 supporting first and second translucent sheets 26 and 28, respectively. A first end of each first arcuate member 22 is connected to a post 4 in a first row of sideposts. The second end of the first arcuate member 22 engages a worm gear disignated by the numeral 15. The first end of the first arcuate member 22 is connected to the upper end of the post 4 by a hinge 30. A first end of the second arcuate frame member 24 is fastened to a post 6 in the second parallel row of sideposts. The second end of the frame member 24 engages the cross-brace 12, which connects the first and second frame members 22 and 24.

Reference is now made to FIG. 3, in which is shown a third embodiment of a greenhouse made in accordance with the principles of the invention, and designated generally at 32.

The greenhouse 32 comprises first and second rows of parallel sideposts 4 and 6, the upper ends of the posts connected to the first and second ends of a first arcuate frame member 8. The first end of the frame member 8 is secured to the upper end of a post 4 by an extension bracket designated by the numeral 34. The first end of a second elongated frame member 10 is secured to the first end of the frame member 8 by a hinge 31. The second end of the second frame member 10 engages a rack-and-pinion assembly 14, which connects the first and second arcuate members 8 and 10 near the midpoint of the first arcuate frame member 8 by a cross-member 12. The second end of the first frame member 8 is linked to the post 6 by a device 40 shown in detail in FIG. 6.

Reference is now made to FIG. 4, which shows the first ends of members 8 and 10 connected by an extension bracket generally designated by the numeral 34.

Reference is now made to FIG. 5, wherein is shown a connection between the first and second arcuate frame members 8 and 10 by nut-and-bolt means 36, 38.

FIG. 6 shows the first arcuate member 8 connected through an adapting device 40 to one of the sideposts 4.

Figure 7:
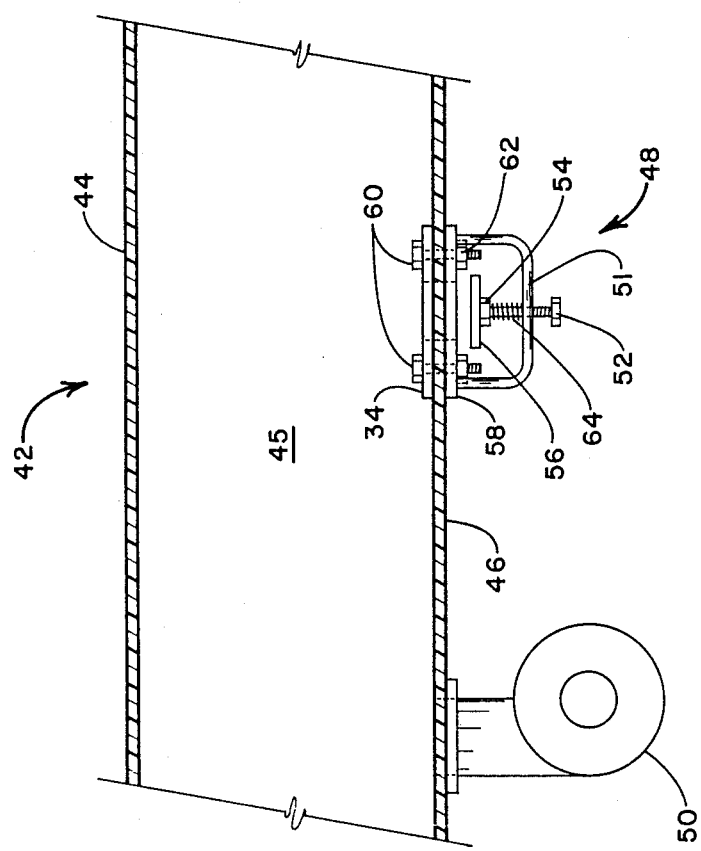
FIG. 7 is a view in cross-section of a first arrangement of apparatus for controlling the air pressure in a pouch between two sheets.

FIG. 7 represents a first embodiment of an arrangement for controlling the air pressure in a pouch between two sheets forming a double roof over a greenhouse.

This first arrangement, designated generally by the numeral 42, comprises first and second translucent sheets 44 and 46, which are sealed together at their ends to form an inflatable pouch 45. As seen in cross-section, a pressurized gas, preferably air, is used to inflate the pouch with an air-blower 50. At least one of the sheets 44, 46 must be flexible to provide an inflatable pouch. The air pressure within the pouch 45 is controlled by a back-presure control valve 48.

The control valve 48 comprises a support bracket 51 through which passes a guide shaft 52. One end of the shaft 52 is fastened through a threaded nut 54 to a movable sealing plate 56. The open end of the bracket 51 includes a flange 58, which is provided with bolts 60 and nuts 62. A spring 64 on the shaft 52 provides biasing means for the plate 56. The spring 64 forces the plate 56 against the flange 58 to seal the valve 48 until the desired pressure is exceeded, whereat the plate 56 is back-pressured away from the flange 58 and the excess pressure is relieved by venting.

Figure 8:
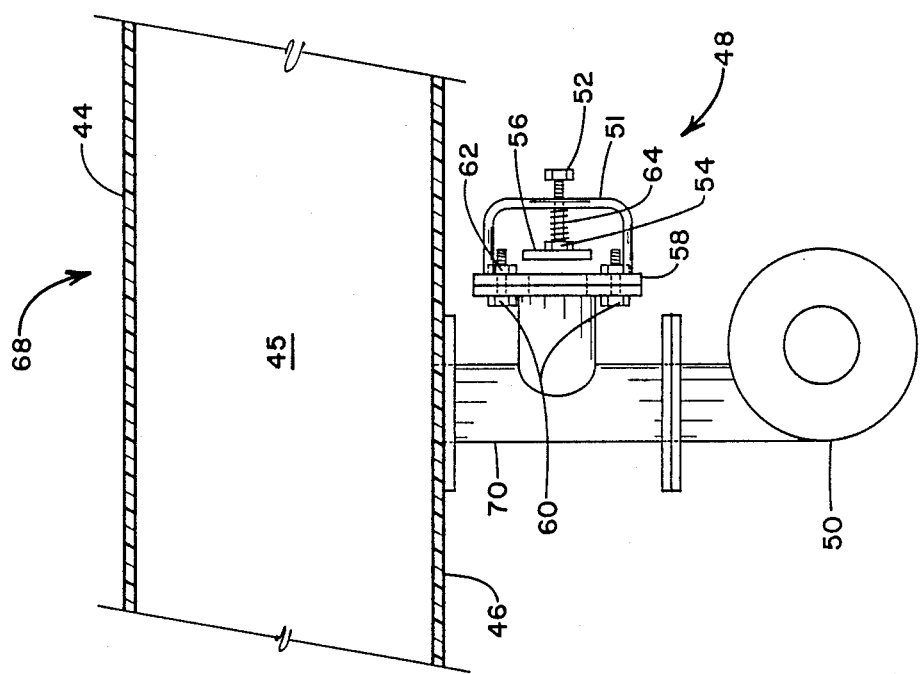
FIG. 8 is a view in cross-section of a second arrangment of apparatus for controlling the air pressure in a pouch between two sheets.

FIG. 8 represents a modification of the first embodiment 42 to provide a second embodiment designated generally as 68. In this second arrangement, the control valve 48 connected directly to the air-blower 50 through a common duct 70. The air-blower 50 is fastened to the duct 70 by a pair of flanges 72.

Two such inflatable pouches are shown in FIG. 1 at 74 and 76, formed by sealing the edges of the first and third sheets 16 and 78, and the edges of the second and fourth sheets 18 and 80.

While certain particular embodiments and details have been described to formulate and illustrate the present invention, it will be apparent to those skilled in the art that many modifications and variations thereof may be made without departing from the basic concept of the invention. For example, any combination of the embodiments of a greenhouse herein disclosed would by the doctrine of equivalents fall within the scope of the present claimed invention.

I claim:

1. A self-ventilated greenhouse, comprising:
    (a) a frame including first and second parallel rows of rigid, elongated, vertical members; a first set or elongated frame members, a first end of each frame member of the first set secured to the upper end of one of the members comprising the first row of vertical members, the second end of each frame member of the first set secured to the upper end of one of the members comprising the second row of vertical members; a second set of elongated frame members disposed above the first set of frame members, shorter than the first set of frame members, and partially overlapping the first set of frame members, a first end of each frame member of the second set secured to the upper end of one of the members comprising the first row of vertical members; a plurality of cross-members hingedly connecting the second end of each frame member of the second set to a frame member of the first set, at a point lying between the ends of the frame member of the second set, to guide the frame members of the second set as they are separated from and reunited with the frame members of the first set to provide intermittent ventilation for the greenhouse; and means for separating and reuniting the first and second sets of frame members;
    (b) a first translucent sheet disposed above and supported by the second set of elongated frame members; and
    (c) a second translucent sheet disposed above and supported by that portion of each of the frame members of the second set extending from the upper end of the second vertical member to the junction of the frame member of the second set with the cross-member, the first and second translucent sheets thereby forming a self-ventilated roof for the greenhouse.

2. The greenhouse defined by claim 1, wherein the first and second sets of frame members are arcuate members, thereby forming a concave roof for the greenhouse.

3. The greenhouse defined by claim 1, wherein the means for separating and reuniting the frame members include a rack and pinion.

4. The greenhouse defined by claim 1, wherein the means for separating and reuniting the frame members include a worm gear.

5. The greenhouse defined by claim 1, wherein the first ends of the elongated frame members are connected to the upper ends of the vertical members by extension brackets.

6. The greenhouse defined by claim 1, further comprising:
    (d) a flexible third translucent sheet disposed above and supported by the second set of frame members, the edges of the first and third sheets sealed together to form an inflatable pouch between the first and third sheets;
    (e) a flexible fourth translucent sheet disposed above and supported by that portion of each of the frame members of the first set extending from the upper end of the second vertical member to the junction of the frame member of the second set with the cross-member, the edges of the second and fourth sheets sealed together of form an inflatable pouch between the second and fourth sheets; the first, second, third, and fourth sheets forming an inflatable, self-ventilated roof for the greenhouse;
    (f) means for inflating the pouch between the first and third sheets, and the pouch between the second and fourth sheets; and
    (g) means for automatically controlling the pressure in the pouch between the first and third sheets, and the pouch between the second and fourth sheets.

7. The greenhouse of claim 1, wherein the means for controlling the pressure include:
    (h) a back-presure control valve, for controlling the pressure in the pockets between the first and third sheets and the presure in the pocket between the second and fourth sheets.

8. A self-ventilated greenhouse, comprising:
    (a) a frame including first and second parallel rows of rigid, elongated vertical members; a first set of elongated frame members, a first end of each frame member of the first set secured to the upper end of one of the members comprising the first row of vertical members, the second end of each frame member of the first set secured to the upper end of one of the members comprising the second row of vertical members; a second set of elongated frame members disposed above the first set of frame members, shorter than the first set of frame members, and partially overlapping the first set of frame members, a first end of a frame member of the second set secured to the first end of a frame member of the first set; a plurality of cross-members hingedly connecting the second end of each frame member of the second set to a frame member of the first set, at a point lying between the ends of the frame member of the second set, to guide the frame members of the second set as they are separated from and recombined with the frame members of the first set to provide intermittent ventilation for the greenhouse; and means for separating and recombining the first and second sets of elongated frame members;
    (b) a first translucent sheet disposed above and supported by the second set of elongated frame members; and
    (c) a second translucent sheet disposed above and supported by that portion of each of the frame members of the second set extending from the upper end of the vertical member in the second row of vertical members to the junction of the frame member of the second set with the cross-member, the first and second translucent sheets thereby forming a self-ventilated roof for the greenhouse.

9. The greenhouse defined by claim 8, wherein the junction of the cross-members with the first set of elongated frame members lies approximately midway between the ends of the first set of elongated frame members.

* * * * *